United States Patent [19]

Hofmann

[11] Patent Number: 4,708,472
[45] Date of Patent: Nov. 24, 1987

[54] STEREOPHOTOGRAMMETRIC SURVEYING AND EVALUATION METHOD

[75] Inventor: Otto Hofmann, Kirchstockach, Fed. Rep. of Germany

[73] Assignee: Messerschmitt-Bölkow-Blohm GmbH, Fed. Rep. of Germany

[21] Appl. No.: 494,772

[22] Filed: May 13, 1983

[30] Foreign Application Priority Data

May 19, 1982 [DE] Fed. Rep. of Germany ....... 3219032

[51] Int. Cl.$^4$ .............................................. G01C 7/02
[52] U.S. Cl. ........................................ 356/2; 250/558; 356/376
[58] Field of Search ................ 356/2, 1, 376; 250/558

[56] References Cited

U.S. PATENT DOCUMENTS 4,313,678  2/1982  Colvocoresses ........................ 356/2
4,504,914  3/1985  Hofmann .............................. 350/2

OTHER PUBLICATIONS

Scarano et al. "Digital Elevation Data Collection System", *Photogrammetric Engineering and Remote Sensing*, vol. 42, No. 4 (Apr. 1976). pp. 489–496.

Primary Examiner—R. J. Rosenberger
Attorney, Agent, or Firm—Toren, McGeady & Associates

[57] ABSTRACT

A stereophotogrammetric surveying and evaluation method is presented. A camera is carried over the terrain of interest, the camera having three sensor lines arranged transversely or obliquely to the line of flight. From the resulting three overlapping line image strips both elevational terrain data and camera orientation data are statistically obtained.

2 Claims, 3 Drawing Figures

STEREOPHOTOGRAMMETRIC SURVEYING AND EVALUATION METHOD

The invention relates to a stereophotogrammetric surveying and evaluation method to obtain orientation data of a camera flying over a terrain, and a digital terrain evaluation model, using three sensor lines A, B, C which are arranged transversely or obliquely to the flight direction, in the image plane of the camera for the continuous line by line scanning of the terrain flown over, and generation of three overlapping line image strips $A_S$, $B_S$, $C_S$ which are taken always from a different perspective, the line images each consisting of a plurality of adjacent image points.

It is known that with opto-electronic cameras in which three sensor lines A, B, C are associated with an optic element (see German Pat. No. 29 40 871) and their lines are arranged transversely to the flight direction or (according to the German Pat. No. 30 43 577) or U.S. Pat. No. 4,504,974 at a specific angle to one another, simultaneously three image strips $A_S$, $B_S$, $C_S$ can be produced. By conjunction of a new line image to the line image sequence which is already assumed as known in its orientation, this line image conjunction can be extended as desired. The generation and supply of this line image conjunction, assumed as known, is however still connected with difficulties and also the stepwise addition of always one new line image is not advantageous from the viewpoint of error theory.

It is therefore the task of the invention to provide a method of the type described above with which the entire line image conjunction and the surveyed terrain surface can be unconditionally reconstructed with information, originating exclusively from this line image survey itself, in a uniform closed method.

When here the reconstruction of the camera orientation along the flight path and the terrain is mentioned, then the following terms and definitions are used which are in part already known from stereophotogrammetry:

(a) Under the outer orientation of a camera one understands its position coordinates $X_0$, $Y_0$, $Z_0$ and its three tilt components $\omega$, $\phi$, $\chi$ at the time of the instantaneous exposure. Basically these definitions are also valid for the electrooptical line camera wherein for each line image number N an orientation set consisting of six orientation parameters is provided. The line duration is electronically exactly set and is in the magnitude of approximately 1/100 sec.

Each line period N generates synchronously three line images of the image strips $A_S$, $B_S$, $C_S$ and, due to the exactly known line period, an exact moment of exposure results for each consecutive line number N. The orientation parameters of the camera change with the consecutive line number N corresponding to the flight movement, and from the line number N the orientation parameters of the camera can be approximately determined when the flight movements are approximately known.

It is not necessary for the present task that the orientation parameters of each line period N are determined because the change of the orientation parameters results more or less continuously and it is therefore sufficient to determine the six orientation parameters along the flight path at specific intervals, i.e. update intervals. These points are called below the update points. Orientation parameters located in between could be determined if required as a function of the orientation parameters of the adjacent update points, for instance by linear interpolation. The magnitude of the update interval depends on the "waviness" of the flight movements and the desired accuracy of reconstruction.

(b) The same applies for the terrain to be reconstructed which is represented by a so-called digital terrain elevation or altitude model. It consists of regularly or irregularly arranged ground points whose horizontal coordinates X, Y and their vertical coordinates Z are to be determined. The point density to be selected depends on the "waviness" of the terrain and the accuracy requirement with which the terrain is to be represented. Also in this case, ground points located in between can be determined if required by interpolation.

Each ground point and consequently also each digital elevation model point, to be selected during evaluation, is projected during flying over with the camera at three different moments or consecutive line periods $N_A$, $N_B$, $N_C$ at three different locations (with always one orientation set, consisting of six parameters) on the three sensor lines A, B, C and there generates an image point to which always the image coordinates x, y in the image plane are assigned (FIG. 1).

It is the task of the invention to determine merely from these image coordinate pairs x, y and their associated consecutive line period numbers N the orientation parameters $X_0$, $Y_0$, $Z_0$, $\omega$, $\phi$, $\chi$ of the update points and the terrain coordinates X, Y, Z of the digital elevation model points, as well as to produce the rectified plan position of each individual image point (orthophotos) and rectified stereographs (stereo-partners).

This task is solved with the features mentioned in the characterizing part of claim 1.

Accordingly in a first process (a) three line image strips are taken synchronously with the opto-electronic line camera, wherein a cycle counter registers the consecutive line periods or image line numbers N of the synchronized sensor lines A, B and C and the discrete image point signals, associated with the line images, are preferably stored in a digital manner.

In a second process (b), in one of the three line image strips, preferably in the image strip $B_S$ generated by the center sensor line B, mesh-like arranged image points which correspond to the digital elevation model points are selected according to specific criteria with the computer and, by means of area correlation in the two other image strips $A_S$ and $C_S$, always the corresponding image points of the same digital elevation model point are found (FIG. 2). The following is additionally commented on this: each individual image point of a line image strip, for instance $A_S$, is always defined by the line image number N and a discrete sensor element (sensor pixel) which lies on the sensor line and whose brightness signal is registered. Since the position of the sensor line in the image plane of the camera and the position of each pixel in the sensor line is known, the x and y coordinates in the image plane can be calculated for each sensor pixel. The line image strips therefore are composed in the flight direction of the consecutive line images N and in the line direction of the consecutive pixels of a line or a sensor and results in a image point matrix with which the area correlation takes place. The pixel number within the respective sensor line defines clearly the image coordinates x, y and the line image number N defines the position of the camera for this moment of exposure and the associated orientation parameters. As a result of this process, there is a list which comprises usually for each digital elevation model point three (at the beginning and the end of the strip only two) image points, associated with the sensor lines A, B or C, and their coordinate pairs x, y as well as an assigned line image number $N_A$, $N_B$, $N_C$.

In a third process (c), based on the approximately known flight movements (for instance constant speed, constant flight direction and flight altitude and normal flight altitude $\omega = \phi = \chi = 0$ are assumed) for each digital elevation model point from the associated line image numbers or moments of exposure $N_A$, $N_B$, $N_C$ approximate orientation parameter sets (always $X_0$, $Y_0$, $Z_0$, $\omega$, $\phi$, $\chi$) are calculated and with those and with the associated image point coordinates $x_A$, $y_A$, and $x_B$, $y_B$ and $x_C$, $y_C$ temporary approximate digital elevation model coordinates X, Y, Z, are calculated with the aid of the spatial intersection.

In a fourth process (d), beam intersection conditions for each digital elevation model point are established, wherein one can either utilize the so-called coplanarity conditions or the collinearity equations. They contain the observed image coordinates x and y, the approximately calculated orientation parameters for the associated moment of exposure N which are represented as functions of the orientation parameters in the update points, and the approximate digital elevation model coordinates. Error equations according to indirect observations are established in a known manner and by least-square a adjustment the most probable and final values of the orientation parameters and the digital elevation model points in any local system of coordinates and scale are determined. By introducing a few so-called control points, this model can be inserted in a known manner into a superposed geodetical or geographical system of coordinates and can be orientated absolutely.

It is to be noted that, as already described, to each digital elevation model point usually three image beams or rays are assigned which are defined by this one digital elevation model point, the positions $X_0$, $Y_0$, $Z_0$ of the perspective center (lens) of the camera in the three moments of exposure $N_A$, $N_B$ and $N_C$, as well as the corresponding three image points x, y on the sensor lines A, B, C. The condition that the beams intersect in the digital elevation model point can be mathematically fulfilled with the so-called coplanarity condition or with the aid of the so-called collinearity equations.

With the aid of the digital elevation model coordinates found in this manner and the corresponding image coordinates in the image strip $B_S$, now all image points of the image strip $B_S$ can be transformed mesh-like onto the correct distortion-free ground plane position by means of known transformation methods (FIG. 3).

In the same manner all image points of the image strips $A_S$ and $B_S$ can be transformed so that distortion-free stereo partners result. This takes place in that the digital elevation model points P are projected by means of an oblique parallel projection onto the ground plane according to $P_A$ and $P_C$ (FIG. 3). Due to the mesh-like transformation of all image points of the strips $A_S$ and $C_S$ into this ground plane position, distortion-free stereographs are produced. For calculation of the transformation parameters always the mesh points in the image strips $A_S$, $B_S$, $C_S$ and the points $P_A$, $P_B$, $P_C$ assigned to them in the ground plane are used.

Figure 1:
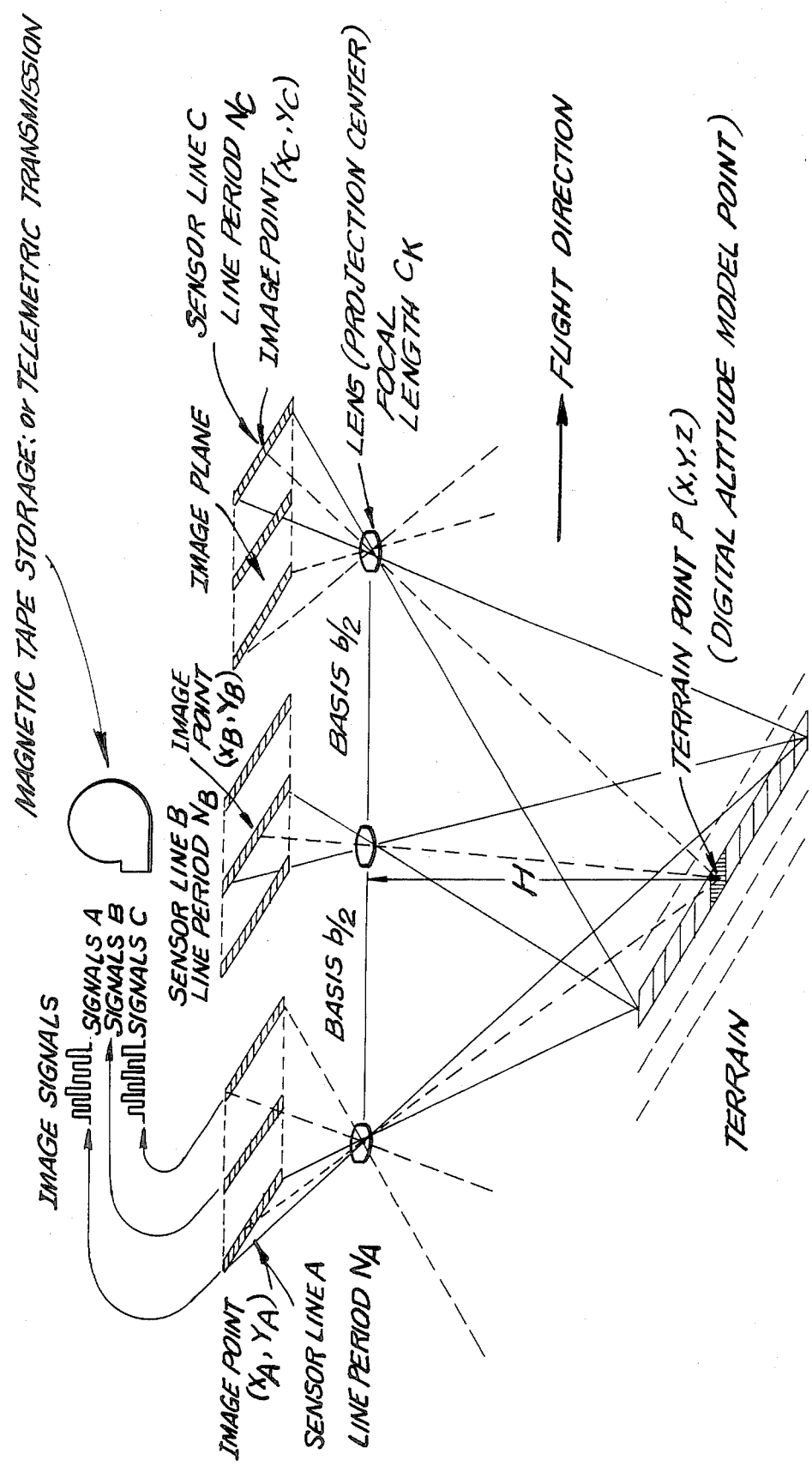
FIG. 1 shows the surveying process with a three sensor line camera. The terrain point (digital elevation model point) P is imaged in the line period $N_A$ onto the sensor line A (image coordinates $x_A$, $y_A$), and in the line period $N_B$ and $N_C$ on the sensor lines B ($x_B$, $y_B$) or C ($x_C$, $y_C$).
Figure 2:
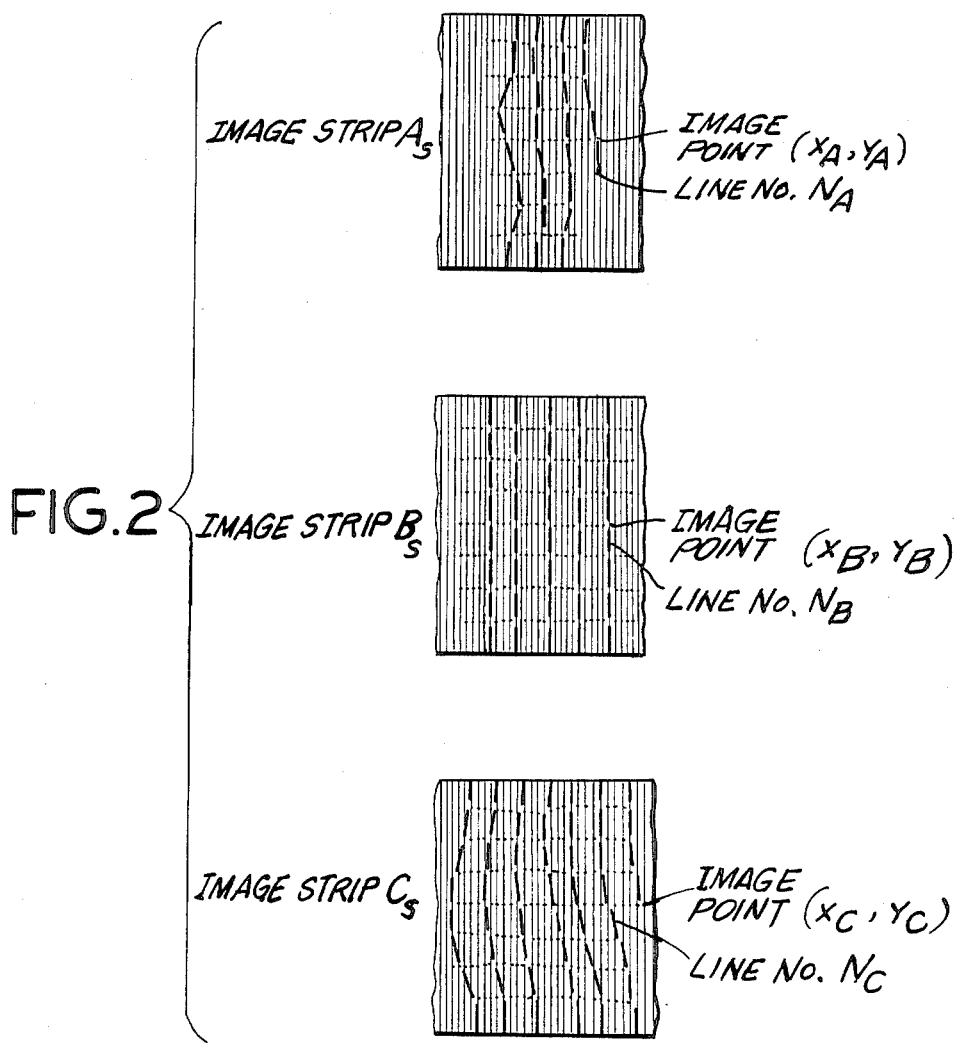
FIG. 2 shows the three line image strips $A_S$, $B_S$, $C_S$ with the individual image lines and the digital elevation model image points, selected in the strip $B_S$ and correlating in the strips $A_S$ and $C_S$.
Figure 3:
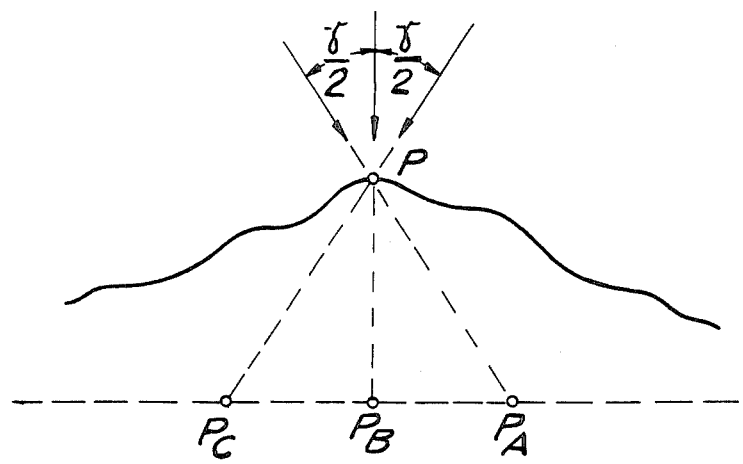
FIG. 3 shows a digital elevation model point with its points $P_A$, $P_B$, $P_C$, projected onto the ground plane.

To perform the elevation method according to the invention a stereograph screen is connected with a computer which performs the area correlaton. On the screen, parallel to the automatic correlation process, the point selection in the image strip $B_S$ and the point correlation in the image strips $A_S$ and $C_S$ runs along and is visibly shown for the operator. The operator consequently has the opportunity to follow the correlation process and, in case of difficulties, can apply corrections by means of interactive intervention and/or if necessary start the interrupted correlation process again.

This visual interactive intervention is also necessary in order to
(a) initiate the start of correlation,
(b) identify and mark control points,
(c) be able to undertake interpretative evaluation of the objects.

The stereograph screen representation takes place either
(a) by superposition of the two partial stereo images in complementary colors (for instance red and green) on one color image screen and observation with corresponding absorption filters and generation of one floating mark which can be moved relative to the image in two dimensions (x, y) and wherein the partial images can be moved with respect to one another in both directions (x, y).
(b) by representation of the two partial stereo images on two halves of an image screen or two separate image screens and generation of two floating marks, assigned to the partial images, which can be moved together or at least one floating mark alone relative to the image in both directions (x and y). The observation takes place in this case with the aid of a stereo optic.

The floating marks are generated by means of a special floating mark generator from the generating electron beam and mark in the image storage the respectively set image point. The floating marks are positioned either by the computer or manually by the observer. The floating marks in both images can be moved together and relative to one another by means of appropriate setting elements (for instance rollers, manual wheels etc.) Basically it makes no difference whether the marks are moved in the images or whether the marks remain in the center on the image screen and the images are moved relative to the stationary marks by so-called panning or scrolling. The latter solution is generally the better since the head of the observer can always remain in the same position.

Such an image screen is generally important for the interpretative and measuring evaluation wherein either the stereo floating marks are guided and set by the observer or can be positioned by computer.

With appropriate hardware interfaces, this image screen can also be used for a real-time observation of the photographed object.

Hard copy printers and image writing instruments, known per se, permit the issuance of graphic results.

The digital data can be put out with alpha numerical printers, magnetic tapes and disks.

In the aircraft, flying body or satellite the camera system (three line stereo camera) is, if necessary, installed with a high density digital tape recorder, known per se.

For real-time transmission, the image data can also be given by telemetry to the ground station and there be stored on high density digital tapes. Subsequently, either in realtime or off line, the conversion of the high density digital tape data into computer compatible data takes place and the automatic and interactive evaluation, further processing, storage and optionally output of the image data with the aid of the stereograph screen and the graphic and digital storage and output units.

I claim:

1. In a stereophotogrammetric surveying and evaluation method to obtain orientation data of a camera flying over a terrain, and a digital terrain altitude (elevation) model, which camera is not attitude controlled and is especially carried by an aircraft, said camera comprising three sensor lines A, B, C, arranged transversely or obliquely to the flight direction in the image plane of the camera for continuous line by line scanning of the terrain flown over, and generation of overlapping line image strips $A_S$, $B_S$, $C_S$, taken always from a different perspective, the line images each consisting of a plurality of adjacent image points, the improvement comprising that (a) all three line sensors are always used and thereby three overlapping line image strips $A_S$, $B_S$, $C_S$ are generated, (b) the line image generation of the sensor lines A, B, C is synchronized and the consecutive numbers N of the line images are registered, (c) in one of the line image strips image points, arranged mesh-like and corresponding to the points of the digital terrain altitude (elevation) model are selected and the corresponding (homologous) image points and their image coordinates x, y and the associated line image numbers $N_A$, $N_B$, $N_C$ are determined by means of area correlation in the two other image strips, (d) due to the approximately known flight movements for each digital altitude (elevation) model point with its associated line image numbers $N_A$, $N_B$, $N_C$, the approximate orientation parameters of said camera and from that and with the image point coordinates $x_A$, $y_A$ and $x_B$, $y_B$ and $x_C$, $y_C$, the digital altitude model coordinates X, Y Z are approximately determined by means of spatial intersection, (e) the establishment of beam intersection conditions for image point beams, belonging to each digital altitude (elevation) model point, takes place, which image point beams are defined by the digital altitude model point, the positions of the perspective center of said camera corresponding to the line image numbers $N_A$, $N_B$, $N_C$, and the image points, located on the sensor lines A, B, C, with the respective x and y coordinates, wherein the orientation parameters are represented as functions of update points which are arranged in certain intervals along the flight path, that error equations are established according to indirect observations, and that the most probable and final values of the orientation parameters in the update points and the digital altitude (elevation) model coordinates are determined by means of a least-squares adjustment process.

2. A method according to claim 1, characterized in that all image points within a digital elevation model mesh are transformed by neans of transformation procedures known per se from the line image strips $A_S$, $B_S$, $C_S$ into the ground plane, wherein for the transformation of a digital elevation model mesh always the corresponding digital elevation model points in the image strips $A_S$, $B_S$, $C_S$ and their point positions $P_A$, $P_B$, $P_C$, projected into the ground plane, are used and in this manner orthophotos and stereo partners are produced.

* * * * *